US010034173B2

(12) United States Patent
Vrzic et al.

(10) Patent No.: US 10,034,173 B2
(45) Date of Patent: Jul. 24, 2018

(54) MTC SERVICE MANAGEMENT USING NFV

(71) Applicant: Huawei Technologies Co., Ltd., Shenzhen (CN)

(72) Inventors: Sophie Vrzic, Kanata (CA); Jaya Rao, Ottawa (CA); Xu Li, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/619,000

(22) Filed: Jun. 9, 2017

(65) Prior Publication Data

US 2017/0280490 A1 Sep. 28, 2017

Related U.S. Application Data

(63) Continuation of application No. 14/726,082, filed on May 29, 2015, now Pat. No. 9,681,473.

(51) Int. Cl.
*H04W 12/06* (2009.01)
*H04W 4/00* (2018.01)
(Continued)

(52) U.S. Cl.
CPC ............ *H04W 12/06* (2013.01); *H04L 45/64* (2013.01); *H04W 4/70* (2018.02); *H04W 76/11* (2018.02)

(58) Field of Classification Search
CPC .... H04W 76/021; H04W 4/005; H04W 12/06
See application file for complete search history.

(56) References Cited

U.S. PATENT DOCUMENTS

2009/0217038 A1 8/2009 Lehtovirta et al.
2012/0004003 A1* 1/2012 Shaheen ............... H04W 4/005
455/509

(Continued)

FOREIGN PATENT DOCUMENTS

CN 102123477 A 7/2011
CN 102595373 A 7/2012
(Continued)

OTHER PUBLICATIONS

"3rd Generation Partnership Project; Technical Specification Group Radio Access Network; Study on RAN Improvements for Machine-type Communications; (Release 11)," 3GPP TR 37.868 V11.0.0, Sep. 2011, 28 pages.

(Continued)

Primary Examiner — Brian D Nguyen
(74) Attorney, Agent, or Firm — Slater Matsil, LLP

(57) ABSTRACT

A method and system for machine type communication (MTC) service management using network function virtualization (NFV) is disclosed. In an embodiment, a method for a machine type communication (MTC) service management using a virtual network function (VNF) includes receiving, by a virtual serving gateway (v-s-SGW), a request for an MTC service from a MTC device through a radio node associated with the MTC device; sending, by the v-s-SGW, an authentication request to an MTC server to authenticate the MTC device; receiving, by the v-s-SGW, an authentication response from the MTC server; and establishing, by the v-s-SGW, an MTC bearer between the v-s-SGW and the radio node if the authentication is successful; wherein the v-s-SGW comprises a virtual connection management (v-CM) and a serving gateway (s-SGW).

21 Claims, 9 Drawing Sheets

(51) Int. Cl.
*H04L 12/715* (2013.01)
*H04W 4/70* (2018.01)
*H04W 76/11* (2018.01)

(56) References Cited

U.S. PATENT DOCUMENTS

| | | |
|---|---|---|
| 2012/0157050 A1 | 6/2012 | Kang et al. |
| 2012/0265919 A1 | 10/2012 | Yegin et al. |
| 2012/0287854 A1 | 11/2012 | Xie et al. |
| 2013/0080782 A1* | 3/2013 | Rajadurai ............ H04L 63/065 713/171 |
| 2013/0136072 A1* | 5/2013 | Bachmann ............ H04W 4/00 370/329 |
| 2013/0155948 A1* | 6/2013 | Pinheiro ............... H04W 4/005 370/328 |
| 2014/0376426 A1 | 12/2014 | Bodreau et al. |
| 2015/0023244 A1* | 1/2015 | Shaheen ............... H04W 4/005 370/312 |
| 2015/0117347 A1 | 4/2015 | Iwai |
| 2015/0223167 A1 | 8/2015 | Duan et al. |
| 2015/0296321 A1 | 10/2015 | Kim et al. |
| 2016/0007316 A1 | 1/2016 | Vaidya et al. |
| 2016/0142860 A1 | 5/2016 | Kim et al. |
| 2016/0165454 A1 | 6/2016 | Li et al. |

FOREIGN PATENT DOCUMENTS

| | | |
|---|---|---|
| CN | 103621126 A | 3/2014 |
| EP | 2866495 A2 | 4/2015 |

OTHER PUBLICATIONS

"3rd Generation Partnership Project; Technical Specification Group Services and System Aspects; Architecture enhancements to Facilitate Communications with Packet Data Networks and Applications (Release 14)," 3GPP TS 23.682 V14.0.0, Jun. 2016, 91 pages.

"3rd Generation Partnership Project; Technical Specification Group Core Network and Terminals; Tsp interface protocol between the MTC Interworking Function (MTC-IWF) and Service Capability Server (SCS) (Release 12)," 3GPP TS 29.368 V12.3.0, Dec. 2014, 28 pages.

"3rd Generation Partnership Project;Technical Specification Group Services and System Aspects; Study on Security Aspects of Machine-Type Communications (MTC) and other Mobile Data Applications Communications Enhancements (Release 12)," 3GPP TR 33.868 V12.1.0, Jun. 2014, 116 pages.

* cited by examiner

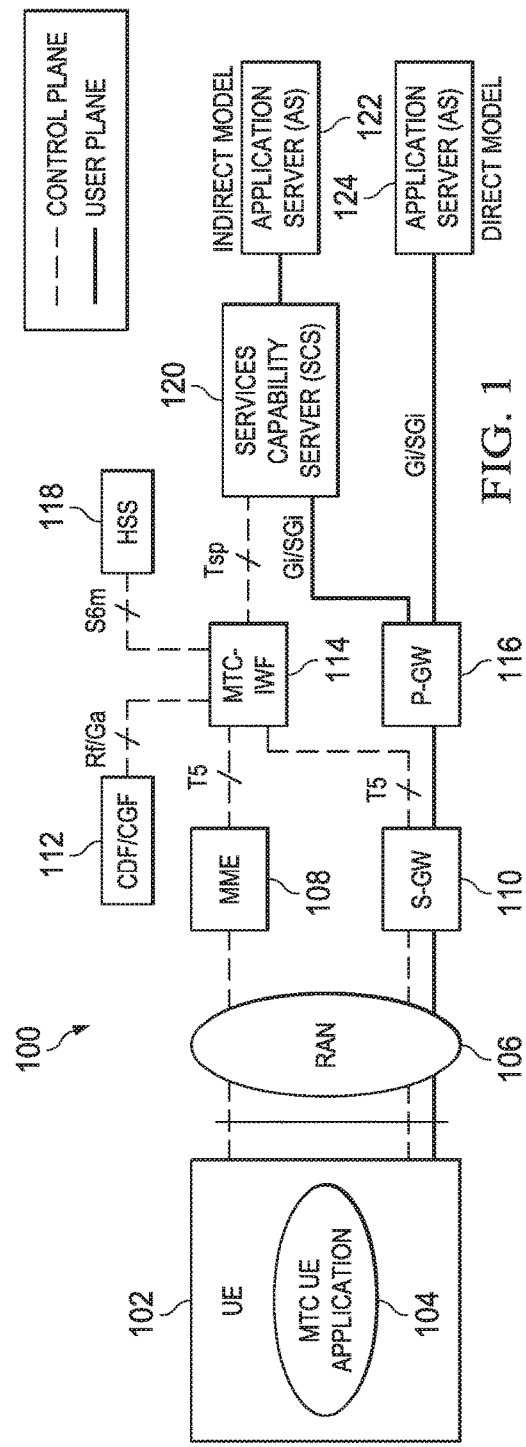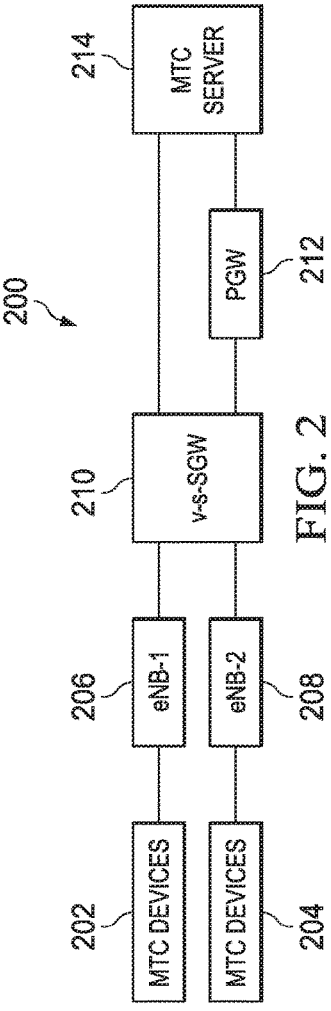

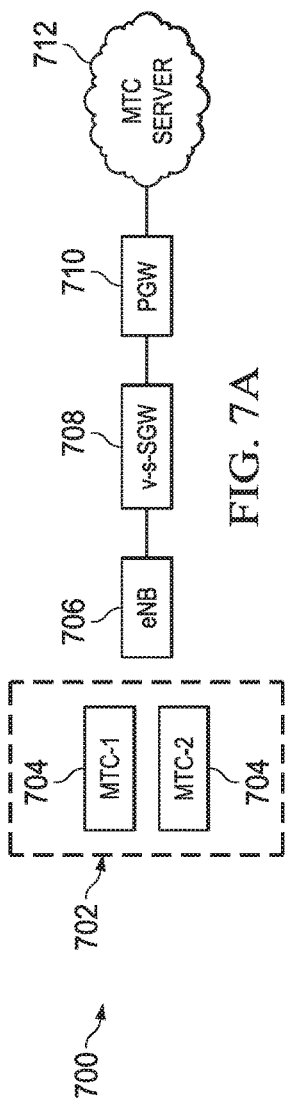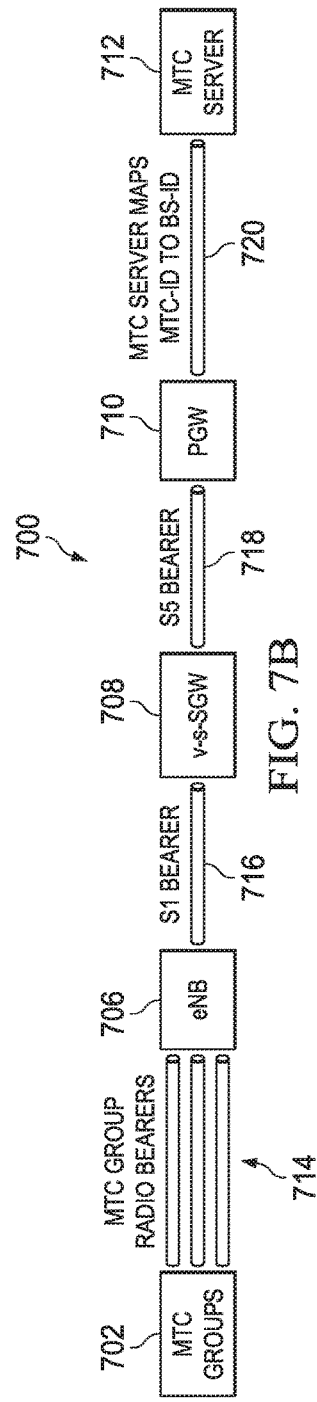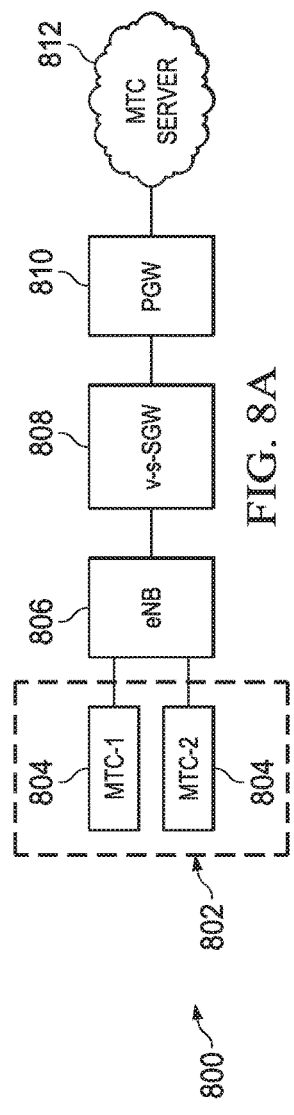

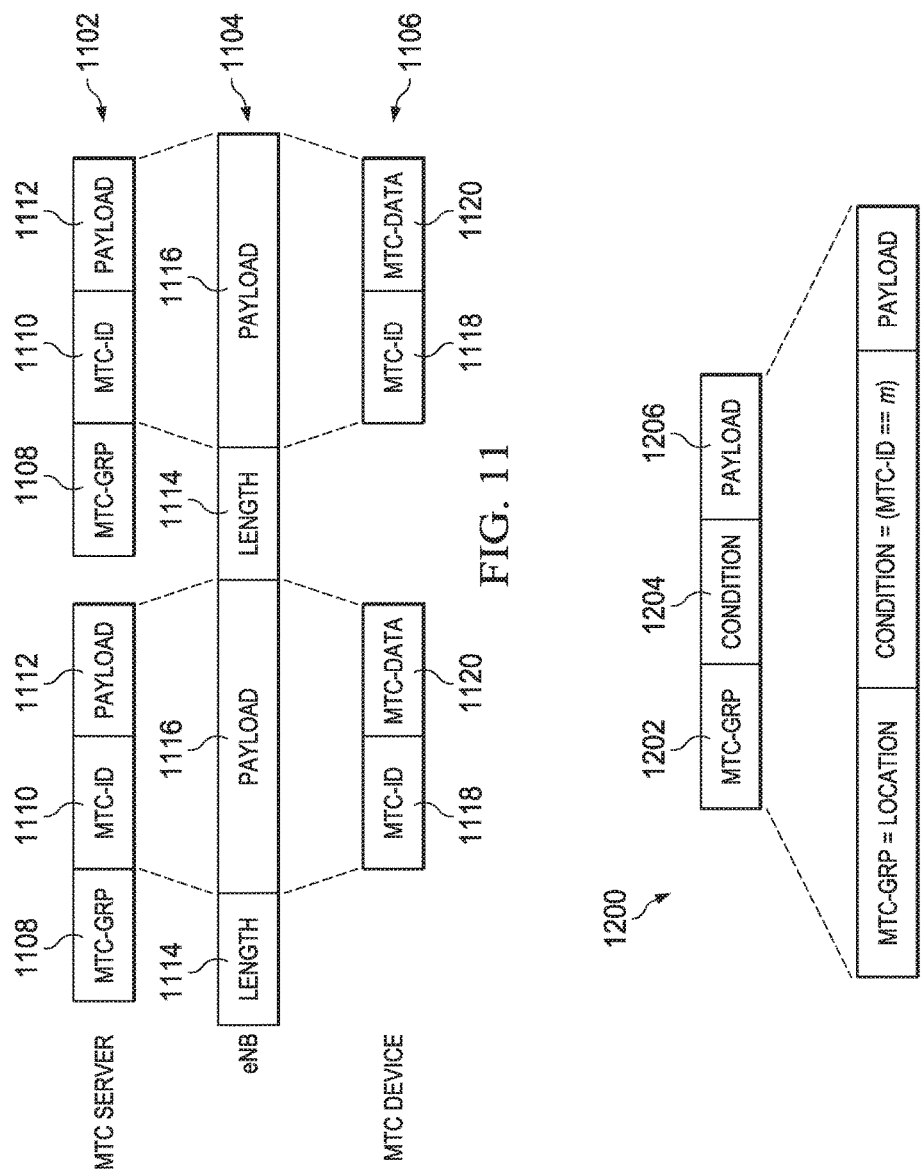

MTC SERVICE MANAGEMENT USING NFV

This application is a Continuation U.S. Non-Provisional application Ser. No. 14/726,082 filed on May 29, 2015, titled "MTC Service Management Using NFV," now U.S. Pat. No. 9,681,473, issued Jun. 13, 2017, which application is hereby incorporated by reference in its entirety.

TECHNICAL FIELD

The present invention relates to a system and method for wireless communication, and, in particular embodiments, to a system and method for machine type communication.

BACKGROUND

Machine type communications (MTC) is expected to increase significantly in the future. By the year 2020, it is expected that the number of MTC devices will exceed a billion. MTC devices will be used to support a broad variety of applications (e.g. Smart Grid, eHealth, Intelligent Transport Systems). The different MTC services may have different network functional and traffic Quality of Service (QoS) requirements. Consequently, provisioning for all the variations can be challenging. Since MTC devices connect to the Internet through mobile networks, MTC will put pressure on the network infrastructure (Radio Access Network (RAN) and core network) as well as the interconnecting nodes (routers and gateways). If a large number of MTC devices attempt to connect to the mobile network simultaneously then the system may become overloaded. A failure can occur in a mobile gateway if there is a sudden increase in the MTC traffic.

SUMMARY

In an embodiment, a method for a machine type communication (MTC) service management using a virtual network function (VNF) includes receiving, by a virtual serving gateway (v-s-SGW), a request for an MTC service from a MTC device through a radio node associated with the MTC device; sending, by the v-s-SGW, an authentication request to an MTC server to authenticate the MTC device; receiving, by the v-s-SGW, an authentication response from the MTC server; and establishing, by the v-s-SGW, an MTC bearer between the v-s-SGW and the radio node if the authentication is successful; wherein the v-s-SGW comprises a virtual connection management (v-CM) and a serving gateway (s-SGW).

In another embodiment, a method for a machine type communication (MTC) service management using a virtual network function (VNF) includes receiving, by a virtual service specific connection management (v-s-CM), a request for an MTC service from a MTC device through a radio node associated with the MTC device; sending, by the v-s-CM, an authentication request to a MTC server to authenticate the MTC device; receiving, by the v-s-CM, an authentication response from the MTC server; and sending, by the v-s-CM, an message to a v-s-SGW to establish an MTC bearer between the v-s-SGW and the radio node if the authentication is successful.

In another embodiment, a system for machine type communication (MTC) service management using a virtual network function (VNF) includes one or more processors and at least one non-transitory computer readable storage medium storing programming for execution by at least one of the one or more processors, the programming including instructions to: receive, by a virtual serving gateway (v-s-SGW), a request for an MTC service from a MTC device through a radio node associated with the MTC device; send, by the v-s-SGW, an authentication request to an MTC server to authenticate the MTC device; receive, by the v-s-SGW, an authentication response from the MTC server; and establish, by the v-s-SGW, an MTC bearer between the v-s-SGW and the radio node if the authentication is successful; wherein the v-s-SGW comprises a virtual connection management (v-CM) and a serving gateway (s-SGW).

In another embodiment, a system for machine type communication (MTC) service management using a virtual network function (VNF) includes one or more processors and at least one non-transitory computer readable storage medium storing programming for execution by at least one of the one or more processors, the programming including instructions to: receive, by a virtual service specific connection management (v-s-CM), a request for an MTC service from a MTC device through a radio node associated with the MTC device; send, by the v-s-CM, an authentication request to a MTC server to authenticate the MTC device; receive, by the v-s-CM, an authentication response from the MTC server; and send, by the v-s-CM, a message to a v-s-SGW to establish an MTC bearer between the v-s-SGW and the radio node if the authentication is successful.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 illustrates a block diagram of a 3GPP MTC system;

FIG. 2 illustrated a block diagram of an embodiment of a system for MTC service management using NFV;

FIGS. 7A and 7B are block diagrams illustrating an embodiment system for MTC bearer management according to option one;

FIGS. 8A and 8B are block diagrams illustrating an embodiment of a system for MTC bearer management according to option two;

FIG. 11 is a block diagram illustrating an embodiment of a downlink (DL) MTC packet format;

FIG. 12 is a block diagram illustrating an alternate embodiment of a DL MTC packet format;

DETAILED DESCRIPTION OF ILLUSTRATIVE EMBODIMENTS

Figure 3:
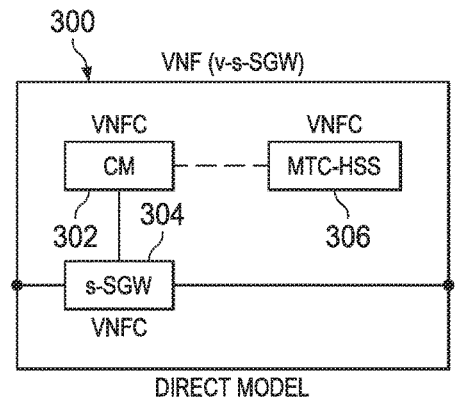
FIG. 3 illustrates a block diagram of an embodiment of a VNF v-s-SGW for the direct model of MTC service management using NFV.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

There has been an ongoing push within the 3rd Generation Partnership Project (3GPP) to provide systems to handle mobile connections from a large number of MTC devices. One approach has been to separate MTC traffic from regular mobile user traffic using RAN level techniques, such as Extended Access Class Barring (EAB), Extended Wait Timer (EWT), and granting dedicated times for MTC traffic. Past efforts have been focused on network improvement for MTC, such as a back off timer defined for congestion control of low priority MTC devices. Other efforts have focused on system improvements for MTC, including defining an MTC architecture, small data and device trigger enhancement, and user equipment (UE) power consumption optimizations.

Ongoing enhancements for MTC include architecture for Services Capability Exposure Function (SCEF). The SCEF provides a means to securely expose the services and capabilities provided by 3GPP network interfaces. Other ongoing enhancements include monitoring events that are related to 3GPP procedures and operations, and reporting of events to the machine-to-machine (M2M) service provider or to third party application providers. Additionally, still other ongoing enhancements include study group based subscriptions, group based device trigger, and group based policies for optimized handling of groups of MTC devices.

However, all of these group based signaling solutions involve existing network elements (e.g., Mobility Management Entity (MME), HSS, etc.). Furthermore, despite years of effort to solve MTC problems, none of these solutions adequately address the problem of a large number of MTC devices attempting to connect to the mobile network simultaneously and causing the system to become overloaded. One or more of the disclosed embodiments provide a solution to the overloading problem as well as other problems.

Disclosed herein are systems and methods that address both UL and DL transmission from/to a large number of devices and how to provide security and authentication for the devices. Also disclosed is method for handling MTC connection requests and MTC mobility. An architecture to handle MTC services is also disclosed.

Since MTC traffic is infrequent and consists of small packet sizes, the disclosed architecture is flexible and, in an embodiment, is created only when required. Network Function Virtualization (NFV) is a new paradigm that instantiates network functions on virtual machines using general purpose hardware. Using NFV, network resources for MTC devices are created and scaled on demand. For each MTC service, customized network functions are created. Within an MTC service, it is possible to provide end-to-end QoS support for individual MTC device groups.

One or more embodiments, of the systems, methods, and apparatuses of this disclosure may include one or more of the following advantages: provide a flexible and dynamic approach to manage uplink (UL) and downlink (DL) transmission from/to a large number of MTC devices using NFV technology; provide an approach to handle MTC connection requests, security and authentication, and bearer management for a large number of MTC devices; within an MTC service, provide end-to-end QoS support for an individual MTC device or a group of MTC devices; and manage MTC mobility. Although described below primarily with reference to an eNB, those of ordinary skill in the art will recognize that in other embodiments, the eNB may be replaced with other types of radio nodes.

FIG. 1 illustrates a block diagram of a 3GPP MTC system 100. The system 100 includes a UE 102, a RAN 106, an MME 108, a serving gateway (SGW) 110, a charging data function/charging gateway function (CDF/CGF) 112, an MTC interworking function (IWF) 114, a packet data network (PDN) gateway (PGW), an HSS 118, an SCS 120, and application servers (AS) 122, 124. The UE 102 includes an MTC UE application 104 that executes on the UE 102. The connections shown in figures and described as direct connections may be direct connections. However, these connections are not necessarily direct connections and may be indirect connections in some embodiments. Thus, in some embodiments, other devices/components may be situated in between two components that are shown as connected directly to one another.

The UE 102 sends and receives control plane messages to the RAN 106. The RAN 106 communicates the control plane messages to the MME 108 in the indirect model and to the SGW 110 in the direct model. The differences between the direct and indirect models are discussed in more detail below. Data plane messages are forwarded from/to the UE 102 by the RAN 106 to/from the SGW 110.

In the indirect model, the MME 108 exchanges control plane messages with the MTC-IWF 114. The MTC-IWF 114 communicates with the CDF/CGF 112, the HSS 118, and the SCS 120. Data plane messages are forwarded from/to the RAN by the SGW no to/from the P-GW 116. In the indirect model, the data plane messages are forwarded from/to the SGW no by the P-GW 116 to/from the SCS 120, which forwards the data plane messages to/from the AS 122. In the direct model, the data plane messages are forwarded from/to the SGW no by the P-GW 116 directly to/from the AS 124.

The MTC-IWF 114 resides in the Home Public Land Mobile Network (HPLMN). The MTC-IWF 114 hides the internal Public Land Mobile Network (PLMN) topology and relays or translates information to invoke specific functionality in the PLMN. The MTC-IWF 114 also authorizes the SCS 120 before communication establishment with the 3GPP network and authorizes control plane request from an SCS 120.

The SCS 120 enables the 3GPP network to securely expose its services and capabilities provided by the 3GPP network interfaces to external third party service provider applications. The SCS 120 may also be connected to one or more MTC-IWFs.

Three different MTC architectural models are supported in the 3GPP MTC architecture. These include the direct model, the indirect model, and the hybrid model. In the direct model, the MTC AS 124 connects directly to the operator's network in order to perform direct user plane communications with the MTC device without the use of any external SCS. In the indirect model, the MTC AS 122 connects indirectly to the operator's network through the services of an SCS in order to utilize additional services for the MTC. In the hybrid model, the MTC AS uses the direct model and the indirect model simultaneously in order to connect directly to the operator's network to perform direct user plane communications with the UE while also using an SCS.

FIG. 2 illustrated a block diagram of an embodiment of a system 200 for MTC service management using NFV. System 200 includes a plurality of MTC devices 202, 204, each connected to a respective eNB 206, 208. The eNBs 206, 208 are connected to a v-s-SGW which is connected to a PGW 212 and an MTC server 214. In this embodiment, the instantiated virtual function, the v-s-SGW 210, replaces the legacy MME 108, HSS 118, and SGW no shown in FIG. 1. The v-s-SGW 210 is responsible for security and authentication with the MTC server 214 using an MTC specific HSS. The v-s-SGW 210 is also responsible for connection management if the MTC devices 202, 204 are mobile as well as for providing a mobility anchor specific to the MTC service. If the MTC devices 202, 204 are capable of supporting multiple RATs, then the v-s-SGW is also responsible for providing connectivity to all the 3GPP network services (e.g., legacy RATs).

FIG. 3 illustrates a block diagram of an embodiment of a v-s-SGW VNF 300 for the direct model of MTC service management using NFV. v-s-SGW VNF 300 may be implemented as the v-s-SGW 210 shown in FIG. 2 and may be used in a direct model. v-s-SGW VNF 300 includes a CM VNF component function (VNFC) 302, a service specific SGW (s-SGW) VNFC 304 (i.e., the VNFC in the VNF), and a MTC-HSS VNFC 306. In the direct model, all packets (e.g., both data plane packets and control plane packets) are sent directly to the s-SGW VNFC 304. If control signaling is sent from the eNB to the v-s-SGW VNF 300, it is sent on the interface (not shown) of the v-s-SGW VNF 300 that is connected to the CM VNFC 302. Otherwise, data is sent on the interface that is connected to the s-SGW VNFC 304.

For DL communication, packets from the PGW to the v-s-SGW are sent to the s-SGW VNFC 304. The s-SGW VNFC 304 filters the control and data packets. Control packets are sent to the CM VNFC 302, which then forwards the packets to the eNB. Data packets are forwarded to the eNB by the s-SGW VNFC 304.

In another embodiment, there may be one interface from the eNB to the v-s-SGW VNFC 304 (as shown in FIG. 3). In this case, both control and data packets are sent on the interface connected to the s-SGW VNFC 304. The s-SGW VNFC 304 then separates the control and data packets. Control packets are sent to the CM VNFC 302 for processing and the data packets are forwarded by the s-SGW VNFC 304 to the P-GW. Control information from the CM VNFC 302 to the AS is sent via the s-SGW VNFC 304.

Figure 4:
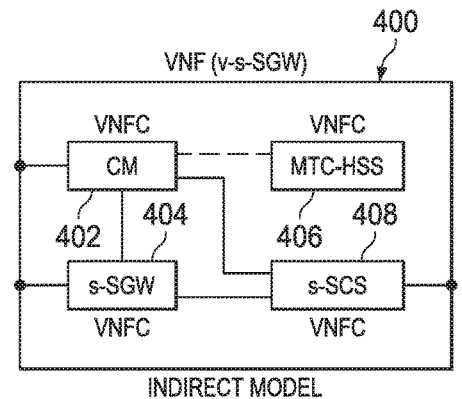
FIG. 4 illustrates a block diagram of an embodiment of a VNF v-s-SGW for the indirect model of MTC service management using NFV.

FIG. 4 illustrates a block diagram of an embodiment of a v-s-SGW VNF 400 for the indirect model of MTC service management using NFV. The v-s-SGW VNF 400 includes a CM VNFC 402, a s-SGW VNFC 404, a MTC-HSS VNFC 406, and a s-SCS VNFC 408.

In the indirect model, the control plane and user plane are split using a service specific SCS (s-SCS) VNFC 404. Value added services for MTC can be included by the mobile operator (VNF vendor) in one or more of the component VNFs. In one embodiment, the s-SCS VNFC 408 can be a simple function that separates the control and data packets received from the PGW.

The eNB sends control signaling to the v-s-SGW VNF 400 on the interface that is connected to the CM VNFC 402. Data is sent on the interface connected to the s-SGW VNFC 404. Control signaling from the CM VNFC 402 and data from the s-SGW VNFC 404 are both sent to the s-SCS VNFC 408, which then forwards the packets to the PGW.

DL communication from the PGW to the v-s-SGW VNF 400 is sent to the s-SCS VNFC 408, which separates the control and data packets and sending the control packets to the CM VNFC 402 and the data packets to the s-SGW VNFC 404, respectively.

Figure 5:
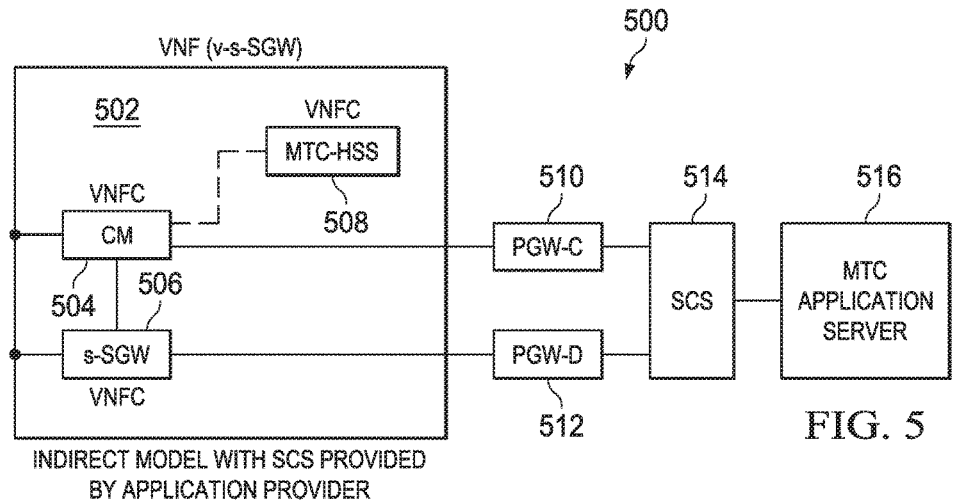
FIG. 5 illustrates a block diagram of another embodiment of a system for the indirect model of MTC service management using NFV.

FIG. 5 illustrates a block diagram of another embodiment of a system 500 for the indirect model of MTC service management using NFV. If the SCS is provided by the MTC service provider then the control plane and data plane can be split by splitting the function of the PGW into control/data plane entities, control plane P-GW (PGW-C) and data plane P-GW (PGW-D). Thus, system 500 includes a v-s-SGW VNF 502, a PGW-C 510, a PGW-D 512, an SCS 514, and an MTC AS 516. The v-s-SGW VNF 502 includes a CM VNFC 504, an s-SGW VNFC 506, and a MTC-HSS VNFC 5o8. The SCS 514 sends control information to the PGW-C 510 and data to the PGW-D 512. The MTC application provider can include value added services for MTC in the SCS VNF. The PGW-C 510 and the PGW-D 512 can also be VNFCs in a PGW VNF or they can be separate VNFs.

In this approach, data is sent from the eNB to the s-SGW VNFC 506, which forwards the data to the PGW-D 512. Control signaling is sent from the eNB to the CM VNFC 504, which then forwards the control packets to the MTC AS 516 via the PGW-C 510. Control and data packets are then sent to the SCS 514 from the PGW-C 510 and the PGW-D 512, respectively.

For DL communication, the MTC AS 516 sends MTC packets to the SCS 514, which splits the control and data packets by sending the control packets to the PGW-C 510 and data packets to the PGW-D 512. The PGW-C forwards the control packets to the CM VNFC 504, which sends the control packets to the eNB, while the PGW-D 512 forwards the data packets to the s-SGW VNFC 506, which sends the data to the eNB.

In an embodiment, the PGW-C 510 and the PGW-D 512 can be separate VNFCs in a single VNF. Alternatively, the PGW-C 510 and the PGW-D 512 can each be separate VNFs.

Figure 6:
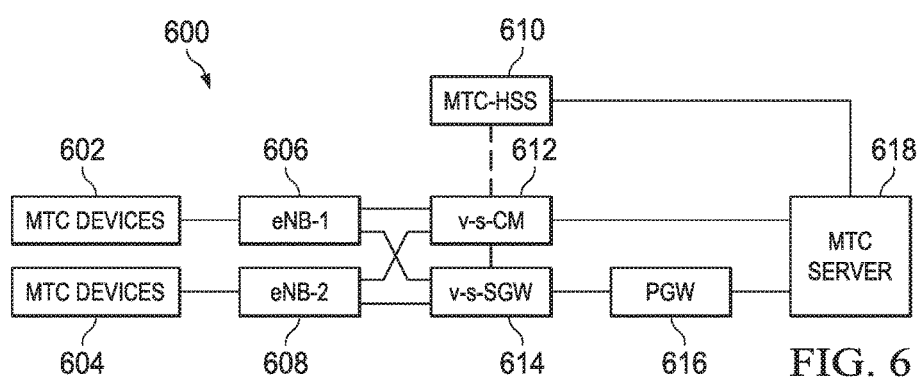
FIG. 6 illustrated a block diagram of an embodiment of a system for MTC service management using NFV.

FIG. 6 illustrated a block diagram of an embodiment of a system 600 for MTC service management using NFV. System 600 is an alternative to system 200 depicted in FIG. 2. System 600 includes a plurality of MTC devices 602, 604 each connected to a respective eNB 606, 608. Each eNB 606, 608 is connected both to a v-s-CM 612 and a v-s-SGW 614. The v-s-SGW 614 is connected to a P-GW 616 which is connected to the MTC server 618. The v-s-CM 612 and the MTC-HSS 610 are both connected to the MTC server 618.

In system 600, multiple MTC specific VNFs (e.g., MTC-HSS 610, v-s-CM 612, and v-s-SGW 614) can be instantiated for an MTC service. The instantiated virtual functions replace the legacy MME 108, HSS 118, and SGW no and eliminate the need for an MTC-IWF and an SCS. The new MTC specific VNFs (e.g., MTC-HSS 610, v-s-CM 612, and v-s-SGW 614) are responsible for security and authentication with the MTC server 618 using an MTC specific HSS (MTC-HSS) (e.g., using the MTC-HSS 610), connection management (CM) if the MTC devices are mobile (e.g., using the v-s-CM 612), and mobility anchor specific to the MTC service (e.g., using the v-s-SGW 614).

In the embodiment depicted in FIG. 6, the control plane and the data plane are split. There is no need to include an SCS or an MTC_IWF. If additional services for the MTC are needed, an SCS VNF can be included by the application provider by inserting the VNF between the PGW 616 and the MTC server 618. Value added services for the MTC can be included by the mobile operator by inserting component functions in the v-s-CM VNF 612 and/or the v-s-SGW VNF 614.

The v-s-SGW VNF 614 provides bearer management between the eNB and the v-s-SGW VNF 614 (MTC-S1 bearer). The v-s-SGW VNF 614 also provides bearer management between the PGW 616 and the v-s-SGW VNF 614 (MTC-S5 bearer). In an embodiment, the v-s-SGW VNF 614 assigns the MTC group identifier (ID) (MTC-GRP or MTC-GRP-ID) to an MTC device 602, 604.

The v-s-CM VNF 612 manages the connection request from the MTC devices 602, 604 and manages the mobility of the MTC devices 602, 605. The v-s-CM VNF 612 also communicates with the MTC server to authenticate the MTC devices 602, 604 and forwards the ciphering and security options to the eNB and MTC devices 602, 604. The v-CM sends a request to the v-s-SGW to provide the bearer management if the authentication and authorization is successful. In an embodiment, the v-CM provides bearer management instead of the v-s-SGW VNF.

The MTC-HSS provides authentication with the MTC server 618 to the MTC devices 602, 604 and includes a database of all the MTC device IDs that belong to the MTC application provider.

The MTC AS 618 authenticates the MTC devices 602, 604 by verifying the MTC-ID with the MTC-HSS. The MTC AS 618 also maps the MTC-ID to the base station (BS) ID (BS-ID), the MTC_GRP, and the v-s-SGW VNF 614. In an embodiment, the MTC AS 618 assigns the MTC-GRP to an MTC device 602, 604. The MTC-GRP can be associated with a Discontinuous Reception (DRX) cycle, which is assigned by the MTC AS 618, to offload the DRX cycle management from the radio nodes. A long DRX cycle can be assigned so that the MTC device can remain in a connected state. This avoids the control signaling associated with state transitions between idle and connected states while receiving the power saving benefits of the long sleep duration.

In an embodiment, in order to handle traffic from a large number of MTC devices, the bearer management method is substantially optimized. By grouping the devices at the access layer and at the entities in the core network, the bearer management can be simplified. The bearer on the access layer is referred to as the radio bearer. In the core network, there is an MTC-S1 bearer between the eNB and the SGW and an MTC-S5 bearer between the SGW and the PGW.

Disclosed herein are two options for MTC bearer management. In both options, there can be multiple group radio bearers established at each eNB for handling MTC traffic. In option one, there is one MTC-S1 bearer and one MTC-S5 bearer for each eNB. In option two, there can be multiple MTC-S1 and MTC-S5 bearers. The number of MTC-S1/MTC-S5 bearers, in the case of option two, corresponds to the number of MTC group radio bearers.

In an embodiment, since the disclosed MTC bearers are group bearers, they are not deleted and re-established when the MTC devices move. This further simplifies the MTC bearer management.

FIGS. 7A and 7B are block diagrams illustrating an embodiment system 700 for MTC bearer management according to option one. System 700 include one or more MTC groups 702, a plurality of MTC group radio bearers 714, an eNB 706, an MTC-S1 bearer 716, a v-s-SGW 708, an MTC-S5 bearer 718, a PGW 710, an MTC bearer 720, and an MTC AS 712. The MTC AS 712 maps the MTC-ID to the BS-ID. Each MTC group 702 may include a plurality of MTC devices 704.

For MTC devices 704 communicating with the same MTC AS 712, traffic from all MTC devices 704 that are attached to the same BS are aggregated at the eNB 706. For a given MTC service, one MTC-S1 bearer is established between the eNB 706 and the v-s-SGW 708 and one MTC-S5 bearer is established between the v-s-SGW 708 and the PGW 710. In this case, the eNB appears as an MTC device to the v-s-SGW 708 and the PGW 710.

The MTC AS 712 is responsible for authenticating the MTC devices 704 using an MTC specific HSS (MTC-HSS), which is a database containing all the MTC-IDs that are authorized to connect with the MTC AS 712. After authenticating the MTC device 704, the MTC AS maps the MTC-ID to the BS-ID, MTC-GRP, and the v-s-SGW 708. The MTC group can either be assigned by the eNB 706, the v-s-SGW 708, or the MTC AS 712.

In another embodiment, the Software Defined Network Controller (SDN-C) or a traffic engineering module connected to the SDN-C can further split the MTC-S1 and MTC-S5 bearers into multiple paths to achieve the required QoS.

Figure 8B:
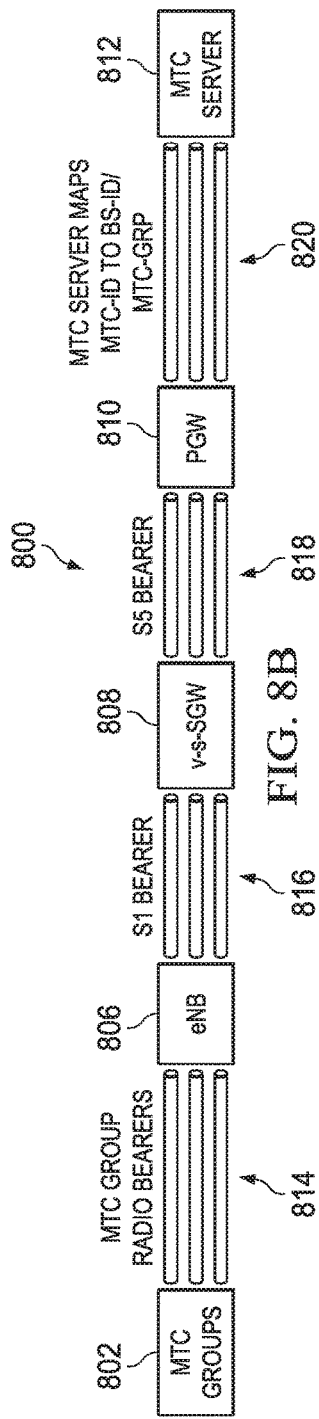

FIGS. 8A and 8B are block diagrams illustrating an embodiment of a system 800 for MTC bearer management according to option two. System 800 includes MTC groups 802, a plurality of MTC group radio bearers 814, an eNB 806, a plurality of MTC-S1 bearers 816, a v-s-SGW 808, a plurality of MTC-S5 bearers 818, a PGW 810, a plurality of MTC bearers 820, and an MTC AS 812. Each MTC group 802 may include a plurality of MTC devices 804.

In option two, there can be a separate MTC-S1 and MTC-S5 bearer for each MTC group 804. In this case, the MTC AS 812 maps the MTC-ID to the eNB and the MTC group ID. The MTC group can be determined by either the MTC AS 812 or the eNB during MTC attachment.

Both MTC-S1 and MTC-S5 bearers can be further split to achieve the desired QoS using traffic engineering.

Figure 9:
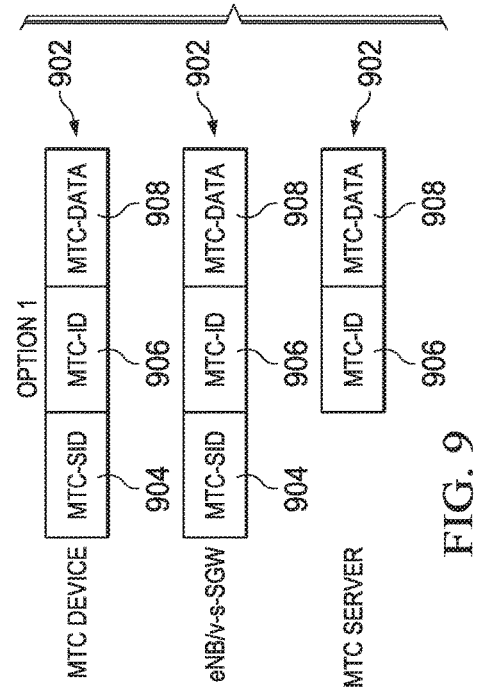
FIG. 9 is a block diagram illustrating an embodiment of an uplink (UL) MTC packet format for bearer option one.

FIG. 9 is a block diagram illustrating an embodiment of a UL MTC packet format for bearer option one. In bearer management option one, in an embodiment, only the MTC service ID (MTC-SID) and the MTC-ID is required since there is only one MTC-S1 and MTC-S5 bearer per MTC service. The packet 902 includes the MTC-SID 904, the MTC-ID 906, and the MTC-data 908. As illustrated in FIG. 9, from the perspective of the MTC device, the header contains the MTC-SID 904 and the MTC-ID 906. From the eNB and v-s-SGW perspective, the header contains the MTC-SID 904. The MTC-ID 906 is treated as data by the eNB and the v-s-SGW. From the perspective of the MTC server, the header only contains the MTC-ID 906.

Figure 10:
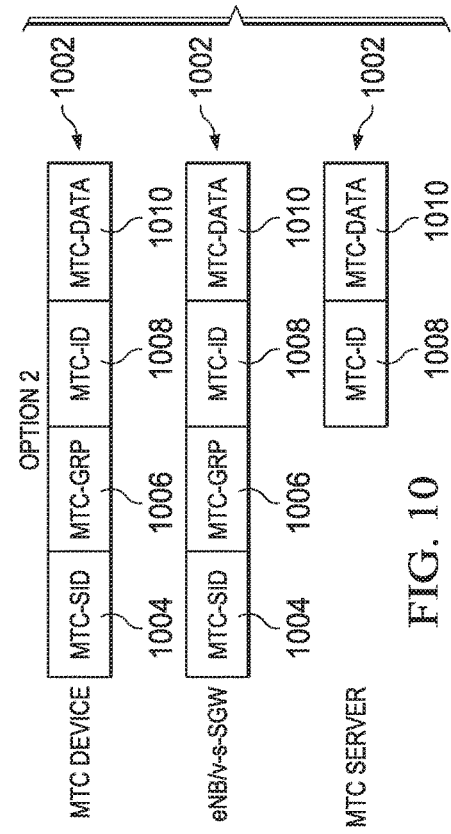
FIG. 10 is a block diagram illustrating an embodiment of a UL MTC packet format for bearer option two.

FIG. 10 is a block diagram illustrating an embodiment of a UL MTC packet format for bearer option two. If there is more than one MTC-S1/MTC-S5 bearer per MTC group, as in bearer management option two, then the MTC-GRP may also be required. Thus, the packet 1002 includes the MTC-SID 1004, the MTC-GRP 1006, the MTC-ID 1008, and the MTC-data 1010. The case for option two is similar to option one except that the MTC-GRP 1006 is also part of the header from the perspective of the MTC device, eNB, and v-s-SGW.

FIG. 11 is a block diagram illustrating an embodiment of a DL MTC packet format. The packet includes the MTC-GRP 1108, the MTC-ID 1110, and the payload 1112. The header information included by the MTC server includes the MTC-GRP 1108. The v-s-SGW forwards the received packet to the eNB according to the MTC-GRP 1108. There is a one to one mapping between the MTC-S1 and MTC-S5 bearers for both bearer management options. The eNB groups the received packets 1102 according to the MTC-GRP 1108 and transmits the packets 1102 to the MTC devices using group based multicast transmission.

In one embodiment, the eNB decodes the header information from the packets received from the v-s-SGW and groups the received packets according to the MTC-GRP 1108. All packets with the same MTC-GRP are transmitted together to the MTC devices. The combined packet 1104 is scrambled by the MTC-GRP to identify the intended group. The combined packet 1104 includes a length 1114 and a payload 1116. The MTC devices that belong to the MTC-GRP search the payload 1116 for their MTC-ID 1118 to determine the MTC-data 1120.

FIG. 12 is a block diagram illustrating an alternate embodiment of a DL MTC packet 1200 format. The DL MTC packet 1200 includes an MTC-GRP 1202, a condition 1204, and a payload 1206. The DL MTC packet 1200 is similar to the DL MTC packet 1102 depicted in FIG. 11 except that the MTC-ID 1110 is be replaced by a logical condition 1204 that the MTC devices evaluate to determine the intended device. In this alternative, the MTC-GRP 1202 can represent a location within a pre-defined grid that is known to both the eNB and the MTC server. The logical condition can specify the MTC device ID (MTC-ID==m) in order to identify a specific MTC device. Location based grouping may be beneficial when the MTC devices within a specific location needs to be identified.

The roles for different entities for one disclosed embodiment using bearer setup option one are described as follows.

The MTC device sends packets to the eNB with the header information containing the MTC-SID and receives packets from the eNB by decoding packets associated with the assigned MTC-GRP ID.

The eNB sets up group radio bearers for each MTC service. The eNB receives packets from the v-s-SGW and maps the received packets to an MTC group. The eNB also receives packets from the MTC devices with header information containing the MTC-SID and sends the packets received from the MTC devices to the v-s-SGW, mapping the MTC radio bearers to the v-s-SGW.

The v-s-SGW establishes an MTC-S1 bearer for each eNB serving the MTC devices and establishes an MTC-S5 bearer with the PGW. When the v-s-SGW receives packets from an eNB, the v-s-SGW sends the packets to the PGW. When the v-s-SGW receives packets from the PGW with header information containing the BS-ID and the MTC-GRP-ID, the v-s-SGW sends the packets to the indicated eNB. In another embodiment, the MTC-S5 bearer can be established with the MTC AS directly, rather than the PGW.

The MTC AS performs authentication and authorization of each MTC device by verifying the MTC-ID with the MTC-HSS. The MTC AS maps the MTC-ID to the BS-ID, the MTC-GRP, and the v-s-SGW. The MTC AS receives packets from the v-s-SGW with header information containing the MTC-ID. The MTC AS sends packets to the MTC devices with header information containing the MTC-ID, the MTC-GRP, and the BS-ID.

The roles for different entities for one disclosed embodiment using bearer setup option two are described as follows.

The MTC device sends packets to the eNB with header information containing the MTC-SID and the MTC-GRP. The MTC device receives packets from the eNB by decoding packets associated with the assigned MTC-GRP ID.

The eNB sets up the group radio bearers for an MTC service. The eNB receives packets from the v-s-SGW on a group MTC-S1 bearer and maps the received packets to an MTC group radio bearer. The eNB receives packets from the MTC devices with header information containing the MTC-SID and the MTC-GRP. The eNB sends the packets received from the MTC devices to the v-s-SGW and maps the MTC radio bearers to the MTC-S1 group bearer.

The v-s-SGW establishes an MTC-S1 bearer for each eNB and for each MTC-GRP serving the MTC devices. The v-s-SGW establishes an MTC-S5 bearer with the PGW for each MTC-GRP. When the v-s-SGW receives packets from the eNB, the v-s-SGW sends the packets to the PGW mapping the MTC-S1 group bearer to the MTC-S5 group bearer. When the v-s-SGW receives packets from the PGW with header information containing the BS-ID and the MTC-GRP-ID, the v-s-SGW sends the packets to the indicated eNB mapping the MTC-S5 group bearer to the MTC-S1 group bearer.

The MTC AS performs authentication and authorization of each MTC device by verifying the MTC-ID with the MTC-HSS. The MTC AS maps the MTC-ID to the BS-ID, the MTC-GRP, and the v-s-SGW. The MTC AS receives packets from the v-s-SGW with header information containing the MTC-ID. The MTC AS sends packets to the MTC devices with header information containing the MTC-ID, the MTC-GRP, and the BS-ID.

Turning now to MTC connection establishment, using the existing UE connection establishment procedure for a large number of MTC devices trying to connect to the network may cause an overload in the network. The disclosed MTC connection establishment procedure minimizes or substantially eliminates this problem. In the disclosed procedure, the MTC device authentication and authorization is offloaded to the MTC AS.

Figure 13:
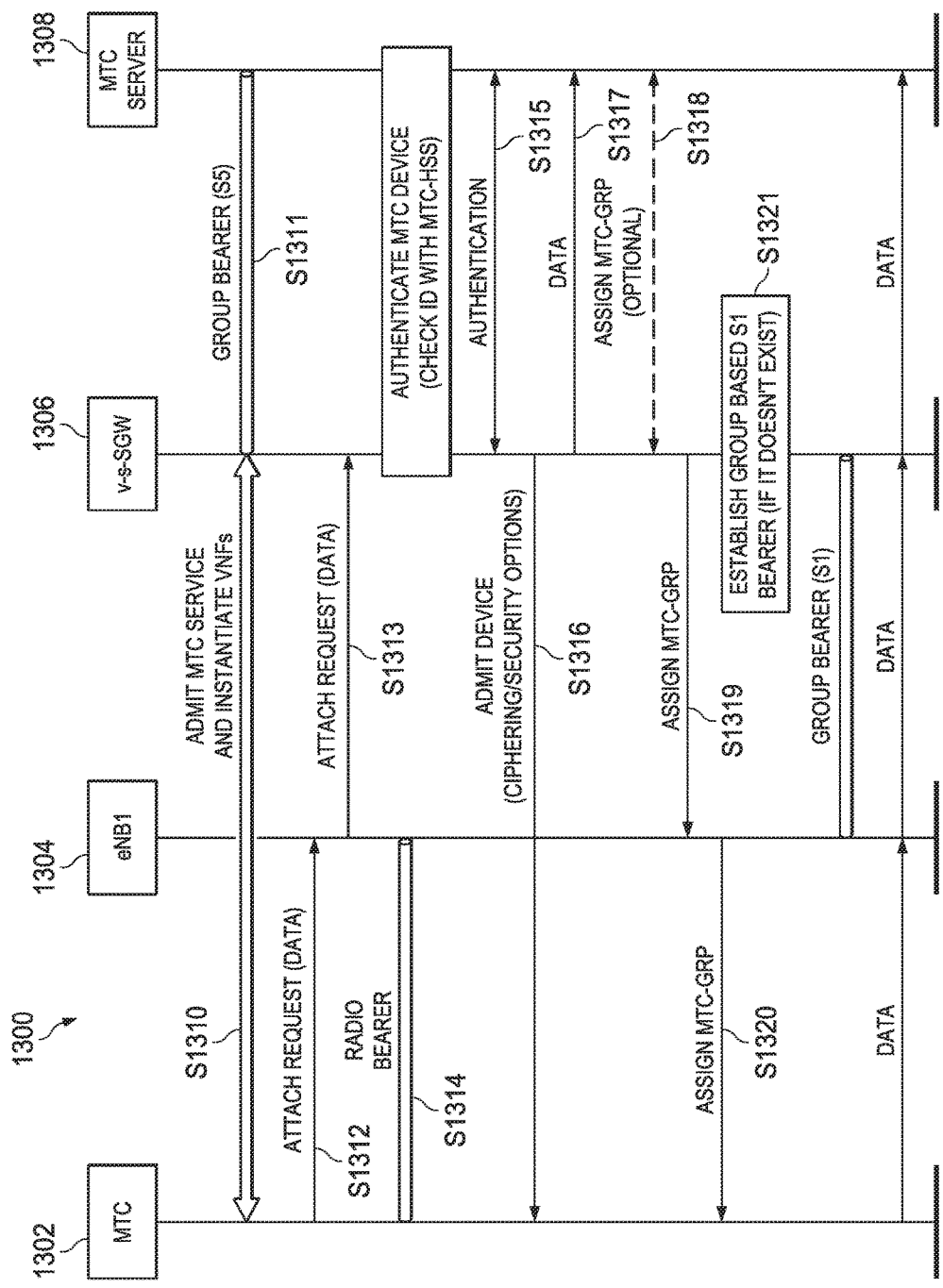
FIG. 13 is a diagram illustrating an embodiment of a method for MTC connection establishment for a system such as described in FIG. 2.

FIG. 13 is a diagram illustrating an embodiment of a method 1300 for MTC connection establishment for a system such as described in FIG. 2. The method 1300 includes communications between MTC devices 1302, an eNB 1304, a v-s-SGW 1306, and an MTC server 1308. MTC devices 1302 may be implemented as, for example, MTC devices 202; eNB 1304 may be implemented as, for example, eNB 206; v-s-SGW 1306 may be implemented as, for example, v-s-SGW 210; and MTC server 1308 may be implemented as, for example, MTC server 214 shown in FIG. 2. The method 1300 may begin at step S1310 by admitting an MTC service and instantiating VNFs for the v-s-SGW 1306. At step S1311, the v-s-SGW 1306 establishes an MTC-S5 group bearer with the MTC server 1308. After the MTC service is established and the v-s-SGW has been instantiated, the MTC devices 1302 can individually connect to the network. To establish a connection, at step S1312, the MTC devices 1302 each send an attach request message to the eNB 1304. At step 1304, the eNB forwards the message to the v-s-SGW 1306. At step S1315, the v-s-SGW 1306 initiates the authentication procedure with the MTC server 1308. The MTC server 1308 checks the MTC-ID with the MTC-HSS. If the respective MTC device 1302 is authenticated, at step S1316, the v-s-SGW 1306 sends an admit device message to the respective MTC device 1302 with the ciphering and security options. The v-s-SGW can assign and send an MTC-GRP ID to the eNB 1304 at step S1319 or, optionally, at step S1318, can do so with assistance from the MTC server. At step S1320, the eNB 1304 forwards the assign the MTC-GRP ID message to the MTC device 1302. At step S1321, the v-s-SGW creates an MTC-S1 bearer if it does not already exist for the UL traffic from the MTC devices 1302 connected to the eNB.

Figure 14:
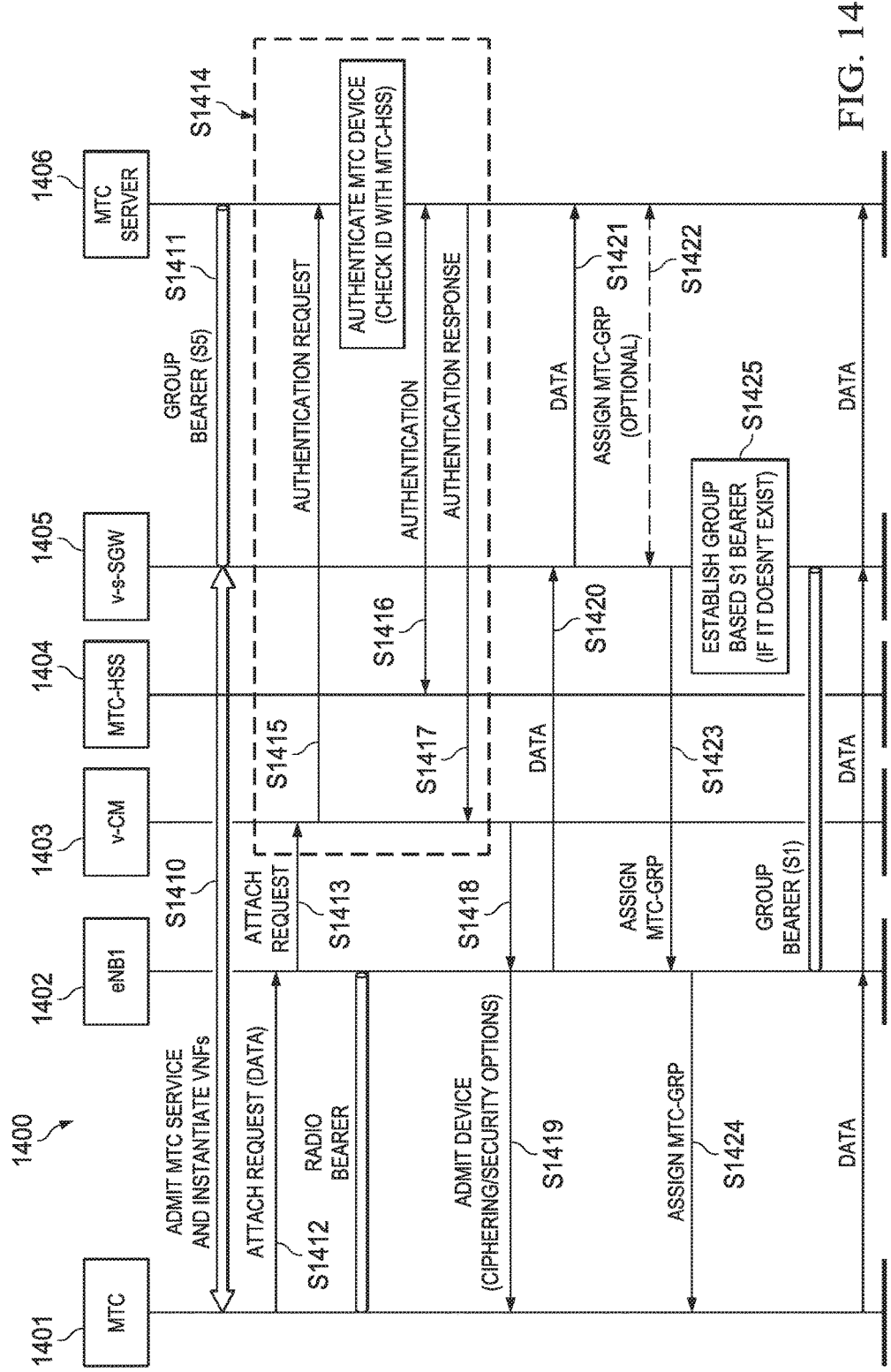
FIG. 14 is a diagram illustrating an embodiment of a method for MTC connection establishment for a system such as described in FIG. 6.

FIG. 14 is a diagram illustrating an embodiment of a method 1400 for MTC connection establishment for a system such as described in FIG. 6. The method 1400 includes communications between MTC devices 1401, an eNB 1402, a v-CM 1403, a MTC-HSS 1404, a v-s-SGW 1405, and an MTC server 1406. MTC devices 1401 may be implemented as, for example, MTC devices 602; eNB 1402 may be implemented as, for example, eNB 606; v-CM 1403 may be implemented as, for example, v-s-CM 612; MTC-HSS 1404 may be implemented as, for example, MTC-HSS 610; v-s-SGW 1405 may be implemented as, for example, v-s-SGW 614; and MTC server 1406 may be implemented as, for example, MTC server 618 shown in FIG. 6. The method 1400 may begin at step 1410 by admitting an MTC service and instantiating VNFs for the v-CM 1403, the MTS-HSS 1404, and the v-s-SGW 1405. At step S1411, the v-s-SGW 1411 establishes an MTC-S5 group bearer with the MTC server 1406. After the MTC service is established and the v-CM 1403, the MTC-HSS 1404, and the v-s-SGW 1405 have been instantiated, one of the MTC devices 1401 sends an attach request to the eNB 1402. In this option, the eNB 1402 sends, at step 1413, the MTC attach request to the v-CM 1403. Then, at step S1414, the v-CM 1403 initiates the authentication request with the MTC server 1406. Step S1414 includes the steps of S1415, S1416, and S1417. At step S1415, the v-CM 1403 sends an authentication request to the MTC server 1406. The MTC-server 1406 authenticates the MTC device(s) 1401 by, at step S1416, verifying the MTC-ID contained in the request with the MTC-HSS. After authenticating the MTC device(s) 1401, at step S1417, the MTC server 1406 sends an authentication response to the v-CM 1403. The ciphering and security options can either be determined by the MTC server 1406, or by a third party, and sent to the v-CM 1403 or can be determined by the v-CM 1403. Once the ciphering and security options are determined, at step S1418, the v-CM 1403 sends (or forwards) the ciphering and security options to the eNB, which, at step S1419, sends the admit device message (with the ciphering and security options) to the MTC device(s) 1401. At step S1420, once the MTC device(s) 1401 have been authenticated, the eNB 1402 forwards the MTC data (received initially in the attach request in step S1412 from the MTC device(s) 1401) to the v-s-SGW 1405, which, at step S1421, forwards the data packet to the MTC server 1406. The MTC group can be determined by the MTC server and sent, at step S1422, to the v-s-SGW 1405 or it can be determined by the v-s-SGW 1405. At step S1423, the v-s-SGW 1405 sends the MTC group assignment (whether determined by the MTC server 1406 or by the v-s-SGW 1405) to the eNB 1402. At step S1424, the eNB 1402 sends the MTC group assignment to the MTC device(s) 1401. In another embodiment, the eNB can determine and send the MTC group assignment to the MTC device(s) 1401 and to the MTC server 1406. After the group assignment has been made, the v-s-SGW 1405, at step S1425, establishes the group based MTC-S1 bearer (if it does not already exist). In one embodiment, the MTC group assignment may correspond to a DRX cycle that is determined by the MTC AS.

Turning now to MTC mobility, in the case where the MTC device undergoes a handover, in an embodiment, the device location must be reported to the v-s-SGW and to the MTC server. The location information may be required by the MTC AS for DL communication to the device. In an embodiment, the location, which includes the BS-ID and the MTC-GRP, must be updated after the device completes the handover. The new MTC-GRP can be assigned by the target eNB, the v-s-SGW, or the MTC server.

Figure 15:
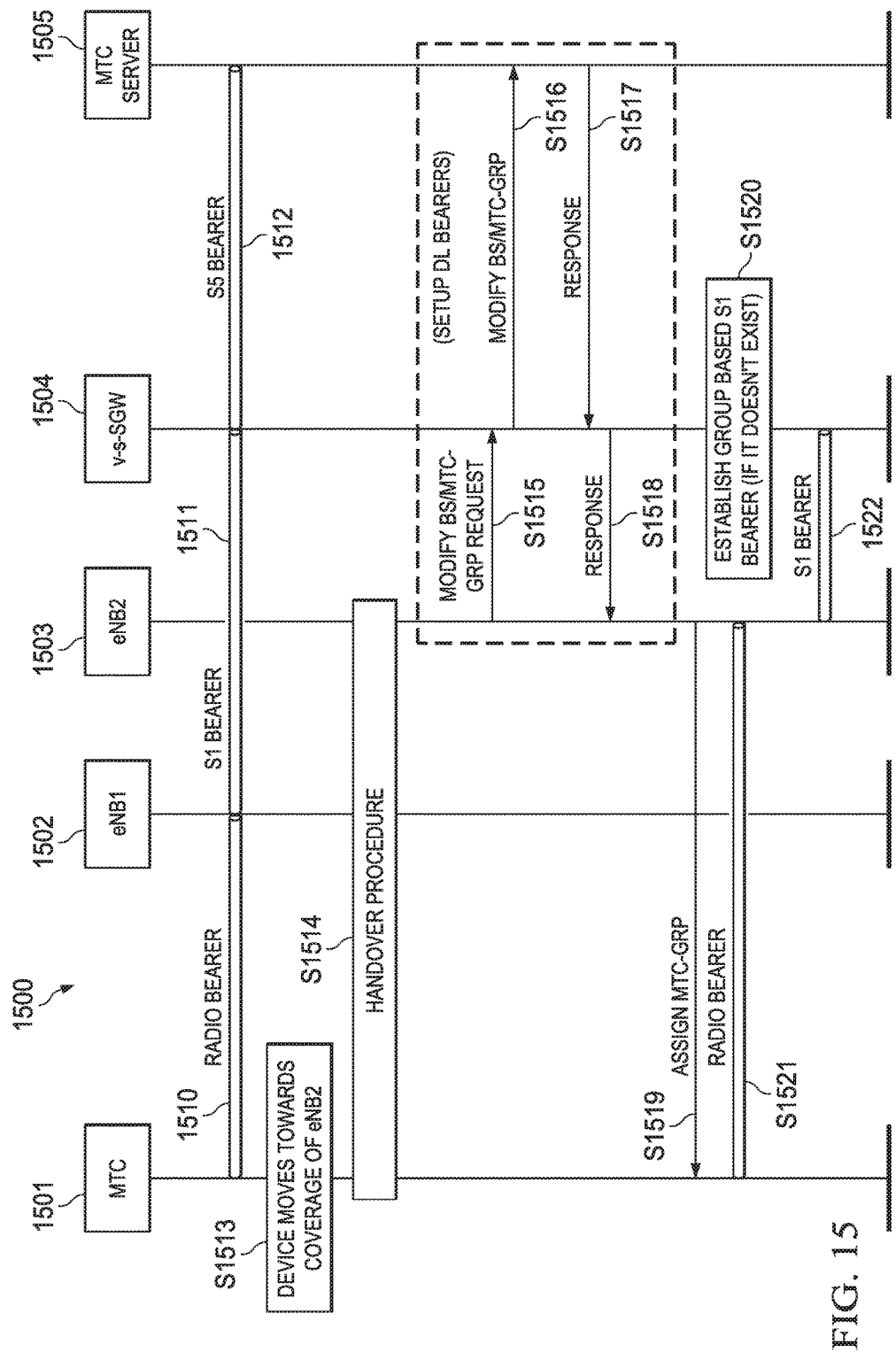
FIG. 15 is a diagram illustrating an embodiment of a method for MTC handover.

FIG. 15 is a diagram illustrating an embodiment of a method 1500 for MTC handover. The method 1500 includes communications between MTC device 1501, an eNBi 1502, an eNB2 1503, a v-s-SGW 1504, and an MTC server 1505. MTC device 1501 may be implemented as, for example, MTC devices 202; eNBi 1502 may be implemented as, for example, eNB1 206; eNB2 1503 may be implemented as, for example, eNB-2 208; v-s-SGW 1504 may be implemented as, for example, v-s-SGW 210; and MTC server 1505 may be implemented as, for example, MTC server 214 shown in FIG. 2. Alternatively, MTC device 1501 may be implemented as, for example, MTC devices 602; eNB1 1502 may be implemented as, for example, eNB-1 606; eNB2 1503 may be implemented as, for example, eNB-2 608; v-s-SGW 1504 may be implemented as, for example, v-s-SGW 614; and MTC server 1505 may be implemented as, for example, MTC server 618 shown in FIG. 6. A radio bearer 1510 is established between MTC device 1501 and eNBi 1502. An MTC-S1 bearer 1511 is established between eNBi 1502 and v-s-SGW 1504. An MTC-S5 bearer is established between the v-s-SGW 1504 and the MTC server 1505. Initially, the MTC device 1501 is served by eNBi 1502. The method 1500 may begin at step S1513 where the MTC device 1501 moves towards the coverage area for eNB2 1503. At step S1514, a handover procedure is initiated. After the normal handover procedure, at step 1515, eNB2 1503 (e.g., the target eNB) sends a request to modify BS-ID and the MTC-GRP for the MTC device 1501 to the v-s-SGW 1504. At step 1516, the v-s-SGW 1504 sends the modify BS/MTC-GRP request to the MTC server 1505 so that the MTC server 1505 can update the MTC device 1501 bearer information. After the MTC server 1505 performs the update, at step 1517, the MTC server 1505 sends a modify BS/MTC-GRP response message back to the v-s-SGW 1504, which, at step S1518, forwards the response to the eNB2 1503 (i.e., the target eNB). The MTC group identifier (i.e., MTC-GRP) may change during handover, therefore, the MTC device 1501 should be notified. Thus, at step S1519, the eNB2 1503 sends an assign MTC-GRP message to the MTC device 1501. A radio bearer 1521 is established between the eNB2 1503 and the MTC device 1501 or the MTC device 1501 is added to an already existing radio bearer. At step 1520, the v-s-SGW 1504 establishes a group based MTC-S1 bearer 1522 between the eNB2 1503 and the v-s-SGW 1504 if the bearer does not already exists.

Figure 16:
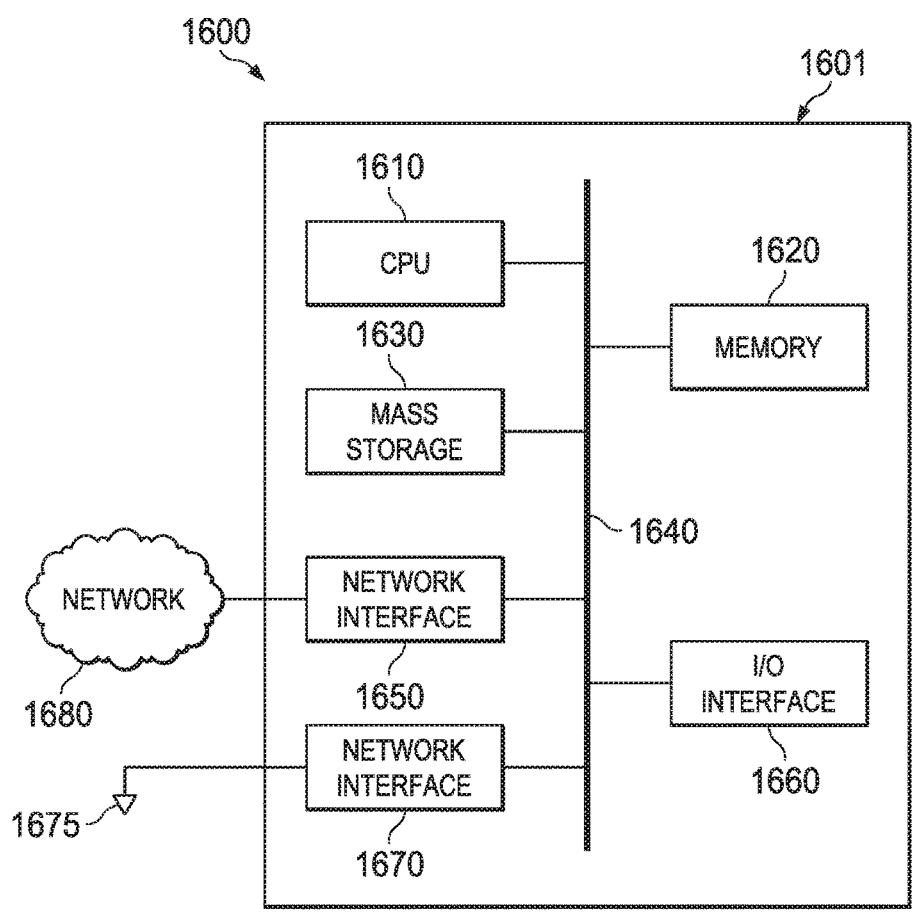
FIG. 16 is a block diagram of a processing system that may be used for implementing the devices and methods disclosed herein.

FIG. 16 is a block diagram of a processing system 1600 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1600 may comprise a processing unit 1601 equipped with one or more input/output devices, such as a speaker, microphone, mouse, touchscreen, keypad, keyboard, printer, display, and the like. The processing unit 1601 may include a central processing unit (CPU) 1610, memory 1620, a mass storage device 1630, a network interface 1650, an I/O interface 1660, and an antenna circuit 1670 connected to a bus 1640. The processing unit 1601 also includes an antenna element 1675 connected to the antenna circuit.

The bus 1640 may be one or more of any type of several bus architectures including a memory bus or memory controller, a peripheral bus, video bus, or the like. The CPU

1610 may comprise any type of electronic data processor. The memory 1620 may comprise any type of system memory such as static random access memory (SRAM), dynamic random access memory (DRAM), synchronous DRAM (SDRAM), read-only memory (ROM), a combination thereof, or the like. In an embodiment, the memory 1620 may include ROM for use at boot-up, and DRAM for program and data storage for use while executing programs.

The mass storage device 1630 may comprise any type of storage device configured to store data, programs, and other information and to make the data, programs, and other information accessible via the bus 1640. The mass storage device 1630 may comprise, for example, one or more of a solid state drive, hard disk drive, a magnetic disk drive, an optical disk drive, or the like.

The I/O interface 1660 may provide interfaces to couple external input and output devices to the processing unit 1601. The I/O interface 1660 may include a video adapter. Examples of input and output devices may include a display coupled to the video adapter and a mouse/keyboard/printer coupled to the I/O interface. Other devices may be coupled to the processing unit 1601 and additional or fewer interface cards may be utilized. For example, a serial interface such as Universal Serial Bus (USB) (not shown) may be used to provide an interface for a printer.

The antenna circuit 1670 and antenna element 1675 may allow the processing unit 1601 to communicate with remote units via a network. In an embodiment, the antenna circuit 1670 and antenna element 1675 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 1670 and antenna element 1675 may also provide Bluetooth and/or WiFi connection to other devices.

The processing unit 1601 may also include one or more network interfaces 1650, which may comprise wired links, such as an Ethernet cable or the like, and/or wireless links to access nodes or different networks. The network interface 1601 allows the processing unit 1601 to communicate with remote units via the networks 1680. For example, the network interface 1650 may provide wireless communication via one or more transmitters/transmit antennas and one or more receivers/receive antennas. In an embodiment, the processing unit 1601 is coupled to a local-area network or a wide-area network for data processing and communications with remote devices, such as other processing units, the Internet, remote storage facilities, or the like.

In an embodiment, disclosed herein is a method for execution at a v-s-SGW provided by a VNF on one or more network nodes for establishing a MTC with an MTC device includes receiving, at the v-s-SGW VNF, a request for an MTC service from the MTC device through a radio node associated with the MTC device; sending an authentication request to a home subscriber server (HSS) to authenticate the MTC device; receiving an authentication response from the HSS; and establishing, by the v-s-SGW VNF, an MTC S1 bearer between the v-s-SGW VNF and the radio node according to the authentication response and if the S1 bearer for the radio node has not been previously established. The method may also include providing a mobility anchor for the MTC service. In an embodiment, the method also includes receiving, at a component of the VNF, a packet from the radio node associated with the MTC device and processing, at a component of the VNF, a packet. The method may also include instantiating components of the v-s-SGW VNF on a plurality of NFV enabled network nodes. In an embodiment, the HSS is an MTC specific HSS. In an embodiment, the MTC specific HSS is located at the MTC Server. In an embodiment, the MTC specific HSS is a component function of the v-s-SGW VNF. The device may be a mobile device and wherein the v-s-SGW VNF is configured to provide connection management. The v-s-SGW VNF may be configured to forward the packet to a services capability server (SCS), to perform the packet processing function specific to the MTC service, and/or to forward the packet to the MTC application server. In an embodiment, the packet includes a control packet and a data packet, and the v-s-SGW VNF includes a first interface to receive the control packet and a second interface to receive the data packet. In an embodiment, the v-s-SGW VNF includes a CM component that is configured to process the control packet. In an embodiment, the packet includes a control packet and a data packet, and the v-s-SGW VNF is configured to separate the control packet from the data packet, forward the control packet to a control plane component, and to forward the data packet to a data plane component. In an embodiment, the control plane component includes a PGW-C and the data plane component includes a PGW-D. In an embodiment, establishing an MTC-S1 bearer includes establishing a plurality of MTC-S1 bearers, wherein each MTC-S1 bearer corresponds to an MTC group radio bearer. The MTC device may include a plurality of MTC devices and the method may include establishing an MTC-S5 bearer between the v-s-SGW VNF and a PGW. Establishing the MTC-S5 bearer may include establishing a plurality of MTC-S5 bearers. The MTC-S1 bearer may correspond to a plurality of MTC group radio bearers aggregated by the eNB. In an embodiment, the MTC-S5 bearer is established between the v-s-SGW VNF and the MTC Application Server directly. A payload carried by the MTC-S1 bearer or the MTC-S5 bearer may include a MTC service ID and an MTC ID. The payload may also include an MTC group ID. In an embodiment, the MTC group ID is associated with a DRX cycle to offload DRX cycle management from the radio node. In an embodiment, the MTC S1 bearer includes one or more paths between a source and destination defined by the MTC S1 bearer. The paths may be determined by an SDN controller or by a traffic engineering module connected to the SDN controller. In an embodiment, the MTC S5 bearer includes one or more paths between a source and destination defined by the MTC S5 bearer and the paths may be determined by the SDN controller or by a traffic engineering module connected to the SDN controller.

In an embodiment, disclosed herein is a system configured for establishing a MTC with an MTC device includes one or more processors and a non-transitory computer readable storage medium storing programming for execution by at least one of the one or more processors, the programming including instructions to: receive a request for an MTC service from the MTC device through a radio node associated with the MTC device; send an authentication request to a HSS to authenticate the MTC device; receive an authentication response from the HSS; and establish an MTC S1 bearer between a v-s-SGW provided by a VNF and the radio node according to the authentication response and if the S1 bearer for the radio node has not been previously established.

In an embodiment, disclosed herein is a method, by a v-s-SGW VNF, for establishing a MTC connection with an MTC device includes receiving, by the v-s-SGW VNF, an attach request from an eNB, wherein eNB receives the attach request from the MTC device; initiating, by the v-s-SGW VNF, an authentication procedure with an application server which checks an MTC ID with an MTC HSS corresponding to the MTC device; and sending, by the v-s-SGW VNF, an admit device message to the MTC device according to successfully authenticating the MTC device with the application server. The admit device message may include ciphering and security options. The method may also include creating an MTC-S1 bearer for uplink traffic from the MTC device and/or assigning an MTC group ID to the MTC device. In an embodiment, the method includes receiving, from a target eNB, a request to modify a BS-ID and the MTC group ID for the MTC device, wherein the target eNB replaces an original eNB after movement of the MTC device; forwarding the request to an MTC server, wherein the MTC server updates MTC bearer information according to the request; and receiving, from the MTC server, a modify BS/MTC-group response message, wherein the BS/MTC-group response message comprises a new MTC group ID for the MTC device. In an embodiment, the method includes establishing an MTC-S1 bearer corresponding to the new MTC group ID if an MTC-S1 bearer for the new MTC group ID does not exist.

In an embodiment, disclosed herein is a method in an eNB for establishing a MTC connection with an MTC device includes receiving, with the eNB, an attach request containing data from the MTC device; sending, with the eNB, an authentication request to a v-CM VNF, the authentication request comprising a MTC ID; receiving, with the eNB, an authentication response message from the v-CM VNF, wherein the authentication response message includes ciphering and security options; forwarding, with the eNB, the authentication response to the MTC device; sending, with the eNB, a MTC group ID to the MTC device; receiving, with the eNB, MTC data from the MTC device, wherein the MTC data includes the MTC group ID; and forwarding, with the eNB, the MTC data to a v-s-SGW VNF. In an embodiment, the MTC group ID is determined by the v-s-SGW VNF. In another embodiment, the MTC group ID is determined by the eNB and the method includes sending the MTC group ID to the v-s-SGW VNF.

In an embodiment, disclosed herein is a network system for establishing a MTC connection with one or more MTC devices includes a v-CM provided by a VNF, the v-CM executed by at least one of one or more processors on one or more network nodes, the v-CM managing connection requests from the one or more MTC devices, and the v-CM providing ciphering and security options to one or more radio nodes associated with the one or more MTC devices; a v-s-SGW provided by the VNF, the v-s-SGW executed by at least one of the one or more processors on the one or more network nodes, the v-s-SGW providing MTC S1 bearer management between at least one radio node and the v-s-SGW, and the v-s-SGW providing MTC S5 bearer management between a PGW and the v-s-SGW; and a virtual MTC HSS provided by the VNF, the v-MTC-HSS executed by at least one of the one or more processors on the one or more network nodes, the v-MTC-HSS authenticates the one or more MTC devices with an MTC server, the v-MTC-HSS forwarding authentication responses from the MTC server to the corresponding ones of the one or more MTC devices via the v-CM.

Disclosed herein, in an embodiment, is a method for a machine type communication (MTC) service management using a virtual network function (VNF) includes receiving, by a virtual serving gateway (v-s-SGW), a request for an MTC service from a MTC device through a radio node associated with the MTC device; sending, by the v-s-SGW, an authentication request to an MTC server to authenticate the MTC device; receiving, by the v-s-SGW, an authentication response from the MTC server; and establishing, by the v-s-SGW, an MTC bearer between the v-s-SGW and the radio node if the authentication is successful; wherein the v-s-SGW comprises a virtual connection management (v-CM) and a serving gateway (s-SGW). In an embodiment, after establishing the MTC bearer, the method also includes at least one of: communicating, by the v-CM, control signaling with the radio node and communicating, by the s-SGW, data packet between the radio node and a PGW; communicating, by the v-CM, control signaling with the radio node and communicating, by the s-SGW, data packet between the radio node and a s-SCS; and communicating, by the v-CM, control signaling between the radio node and a control plane packet data network (PDN) gateway (PGW-C), and communicating, by the s-SGW, data packet between the radio node and a data plane packet data network (PDN) gateway (PGW-D). In an embodiment, establishing the MTC bearer also includes one of: establishing, by the v-s-SGW, an MTC S1 bearer with the radio node and an MTC S5 bearer with a PGW, wherein the MTC-S1 bearer corresponds to at least one MTC group radio bearer; and establishing, by the v-s-SGW, multi-MTC S1 bearers with the radio node and multi MTC S5 bearers with a PGW, wherein each MTC-S1 bearer corresponds to each MTC group radio bearer of at least one MTC group radio bearers. In an embodiment, sending the authentication request to the MTC server includes sending, by the v-s-SGW, at least one of an MTC ID and an MTC group ID to a MTC server to authenticate the MTC device with a MTC-HSS. In an embodiment, at least one of the MTC ID and the MTC group ID is carried in a payload. The MTC S1 bearer may include one or more paths between a source and destination defined by the MTC S1 bearer. The paths may be determined by an SDN controller or by a traffic engineering module connected to the SDN controller.

Disclosed herein is an embodiment of a method for a machine type communication (MTC) service management using a virtual network function (VNF). The method includes receiving, by a virtual service specific connection management (v-s-CM), a request for an MTC service from a MTC device through a radio node associated with the MTC device; sending, by the v-s-CM, an authentication request to a MTC server to authenticate the MTC device; receiving, by the v-s-CM, an authentication response from the MTC server; and sending, by the v-s-CM, an message to a v-s-SGW to establish an MTC bearer between the v-s-SGW and the radio node if the authentication is successful. In an embodiment, after sending the message to the v-s-SGW, the method the method also includes communicating, by the v-CM, control signaling with the radio node and communicating, by the v-s-SGW, data packet between the radio node and a PGW. In an embodiment, after sending the message to the v-s-SGW, the method also includes one of: establishing, by the v-s-SGW, an MTC S1 bearer with the radio node and an MTC S5 bearer with a PGW, wherein the MTC-S1 bearer corresponds to at least one MTC group radio bearer; and establishing, by the v-s-SGW, multi-MTC S1 bearers with the radio node and multi MTC S5 bearers with a PGW, wherein each MTC-S1 bearer corresponds to each MTC group radio bearer of at least one MTC group radio bearers.

Disclosed herein, in an embodiment, is a system for machine type communication (MTC) service management using a virtual network function (VNF) that includes one or more processors and at least one non-transitory computer readable storage medium storing programming for execution by at least one of the one or more processors, the programming including instructions to: receive, by a virtual serving gateway (v-s-SGW), a request for an MTC service from a MTC device through a radio node associated with the MTC device; send, by the v-s-SGW, an authentication request to an MTC server to authenticate the MTC device; receive, by the v-s-SGW, an authentication response from the MTC server; and establish, by the v-s-SGW, an MTC bearer between the v-s-SGW and the radio node if the authentication is successful; wherein the v-s-SGW comprises a virtual connection management (v-CM) and a serving gateway (s-SGW).

Disclosed herein, in an embodiment, is a system for machine type communication (MTC) service management using a virtual network function (VNF) that includes one or more processors and at least one non-transitory computer readable storage medium storing programming for execution by at least one of the one or more processors, the programming including instructions to: receive, by a virtual service specific connection management (v-s-CM), a request for an MTC service from a MTC device through a radio node associated with the MTC device; send, by the v-s-CM, an authentication request to a MTC server to authenticate the MTC device; receive, by the v-s-CM, an authentication response from the MTC server; and send, by the v-s-CM, a message to a v-s-SGW to establish an MTC bearer between the v-s-SGW and the radio node if the authentication is successful.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in a network node for connection establishment in a wireless network, comprising:
   receiving, by the network node, an attach request from a user equipment (UE);
   obtaining, by the network node, after receiving the attach request, ciphering options and security options from a serving gateway; and
   transmitting, towards the UE, the ciphering options, security options, and mobility context information associated with the UE, wherein the ciphering options, security options, and mobility context information associated with the UE persist with UE movement.

2. The method of claim 1, further comprising generating the mobility context information to include an assigned machine type communication (MTC) group identifier.

3. The method of claim 1, further comprising authenticating the UE.

4. The method of claim 3, wherein obtaining the ciphering options and security options comprise obtaining the ciphering options and the security options after authenticating the UE.

5. The method of claim 3, wherein authenticating the UE comprises requesting authentication from machine type communication (MTC) home subscriber server (HSS).

6. The method of claim 5, wherein the requesting authentication comprises sending an identifier associated with the UE to the MTC HSS.

7. The method of claim 1, wherein the mobility context information comprises an identifier of a group bearer that persists during movement of the UE.

8. A system for connection establishment in a wireless network, comprising:
   one or more processors; and
   at least one non-transitory computer readable storage medium storing programming for execution by at least one of the one or more processors, the programming including instructions for:
   receiving, by the network node, an attach request from a user equipment (UE);
   obtaining, by the network node, after receiving the attach request, ciphering options and security options from a serving gateway; and
   transmitting, towards the UE, the ciphering options, security options, and mobility context information associated with the UE, wherein the ciphering options, security options, and mobility context information associated with the UE persist with UE movement.

9. The system of claim 8, wherein the instructions further comprise instructions for generating the mobility context information to include an assigned machine type communication (MTC) group identifier.

10. The system of claim 8, wherein the instructions further comprise instructions for authenticating the UE.

11. The system of claim 10, wherein the instructions for obtaining the ciphering options and security options comprise instructions for obtaining the ciphering options and the security options after authenticating the UE.

12. The system of claim 10, wherein the instructions for authenticating the UE comprise instructions for requesting authentication from machine type communication (MTC) home subscriber server (HSS).

13. The system of claim 12, wherein the instructions for requesting authentication comprises instructions for sending an identifier associated with the UE to the MTC HSS.

14. The system of claim 8, wherein the mobility context information comprises an identifier of a group bearer that persists during movement of the UE.

15. A network node configured for establishing a connection between a user equipment (UE) and a wireless network, comprising:
   a receiver configured to receive an attach request from the UE;
   a security processor configured to obtain ciphering options and security options from a serving gateway after receiving the attach request; and
   a transmitter configured to transmit, towards the UE, the ciphering options, security options, and mobility context information associated with the UE, wherein the ciphering options, security options, and mobility context information associated with the UE persist with UE movement.

16. The network node of claim 15, further comprising a generator configured to generate the mobility context information to include an assigned machine type communication (MTC) group identifier.

17. The network node of claim 15, further comprising an authenticator to authenticating the UE.

18. The network node of claim 17, wherein the security processor is further configured to obtain the ciphering options and the security options after authenticating the UE.

19. The network node of claim 17, wherein the authenticator is further configured to request authentication from machine type communication (MTC) home subscriber server (HSS).

20. The network node of claim 19, wherein the authenticator is further configured to send an identifier associated with the UE to the MTC HSS.

21. The network node of claim 15, wherein the mobility context information comprises an identifier of a group bearer that persists during movement of the UE.

* * * * *